United States Patent [19]

Komanowsky et al.

[11] 4,085,044

[45] Apr. 18, 1978

[54] TREATMENT OF LIME-SULFIDE TANNERY UNHAIRING WASTE

[75] Inventors: Michael Komanowsky, Philadelphia; Howard I. Sinnamon, Jenkintown, both of Pa.

[73] Assignee: The United States of America as represented by the Secretary of Agriculture, Washington, D.C.

[21] Appl. No.: 801,274

[22] Filed: May 27, 1977

[51] Int. Cl.² ............................................. C02B 1/20
[52] U.S. Cl. ..................................... 210/45; 210/48; 210/54; 210/56; 260/112 R
[58] Field of Search ............ 210/42 R, 45, 48, 51-54, 210/56, 71; 8/94.16, 150.5; 260/112 R

[56] References Cited

U.S. PATENT DOCUMENTS

| 1,263,532 | 4/1918 | Cummings | 210/42 R |
| 4,017,391 | 4/1977 | Black | 210/45 |

OTHER PUBLICATIONS

Komanowski et al., "Separation of Lime-Sulfide Effluent Components to Advance Their Use and Reuse", JALCA 71, pp. 229-230 (1976).

Cooper et al.; "Effect of Flocculants on the Sedimentation of Organic Solids in Tannery Unhairing Effluents" Proc. of the 29th Purdue Ind. Waste Conf., pp. 510-518 (1974).

*Primary Examiner*—Charles N. Hart
*Assistant Examiner*—Benoit Castel
*Attorney, Agent, or Firm*—M. Howard Silverstein; William E. Scott; David G. McConnell

[57] ABSTRACT

Improvements in the treatment of lime-sulfide unhairing wastes from both salt-cured and unsalted hides are provided. After undissolved lime is flocculated out of the waste of a salt-cured hide and the supernatant acidified to liberate hydrogen sulfide, the hydrogen sulfide is flashed off under reduced pressure at about from 100° to 150° F. The waste from unsalted hides is sparged with carbon dioxide prior to flocculation, the sparged waste is flocculated with a strongly cationic polyelectrolyte, and the hydrogen sulfide flashed off from the acidified supernatant liquid.

2 Claims, No Drawings

TREATMENT OF LIME-SULFIDE TANNERY UNHAIRING WASTE

BACKGROUND OF THE INVENTION

1. Field of the Invention

This invention relates to a process for treating lime-sulfide, tannery unhairing waste and more particularly to improvements in the treatment of such waste.

2. Description of the Prior Art

The use of synthetic or organic, nonionic, anionic, and cationic polyelectrolytes as flocculants in the treatment of industrial waste and tannery effluents has been reported (Proceedings of the 18th Purdue Industrial Waste Conference, pages 447–459 and 534–549, 1963; JALCA 70, 18–29 and 226, 1975; JALCA 65, 31–47, 1970; JALCA 63, 396–409, 1968). Acidification of the deflocculated waste to liberate $H_2S$ and absorption of the $H_2S$ in caustic medium is also known (Das Leder, 25, 75–77, 1974; JALCA 71, 230, 1976).

BRIEF SUMMARY OF INVENTION

An improvement in the treatment of lime-sulfide unhairing waste from salt-cured hides is provided wherein, after the undissolved lime is flocculated out of the waste and the supernatant liquid acidified to liberate hydrogen sulfide, the hydrogen sulfide is flashed off from the supernatant liquid at a temperature of about from 100° to 150° F and under a vacuum of about from 10 to 29.9 inches of mercury. An improvement in the treatment of lime-sulfide unhairing waste from unsalted hides is also provided wherein the waste is sparged with $CO_2$ prior to flocculation, the sparged waste flocculated with a strongly cationic polyelectrolyte, and the hydrogen sulfide flashed off from the supernatant acidified liquid at a temperature of about from 100° to 150° F and under a vacuum of about from 10 to 29.9 inches of mercury.

DETAILED DESCRIPTION OF THE INVENTION

Our complete treatment process, that is, flocculation and collection of the lime cake, acidification of the supernatant liquid and the concomitant liberation of hydrogen sulfide, flashing off and absorption of the hydrogen sulfide, and recovery of a high protein fraction is done on a continuous basis. The waste is first flocculated which concentrates the undissolved lime, along with some fat and some protein, in the lower section of a clarifier. The concentrated lime sludge is drained from the clarifier and centrifuged to yield a solid product which is mostly lime. The centrate or supernatant from the centrifugation is mixed with new waste as it enters the system to undergo flocculation. The supernatant after flocculation is acidified to below pH 4.0, preferably to pH 2.0, to liberate hydrogen sulfide, and then flashed in a flashing chamber at about from 100° to 150° F and under a vacuum of about from 10 to 29.9 inches of mercury. The flashed-off hydrogen sulfide is absorbed in a caustic solution and is reclaimed for reuse. In our continuous process, we obtain the required low pressure for the flashing operation by utilizing a wet type vacuum pump which uses aqueous sodium hydroxide solution as sealing liquid. Consequently, the pump also serves as a vehicle for absorption of the hydrogen sulfide. After the hydrogen sulfide is flashed off, the liquid from the flashing chamber is filtered to recover a fraction having a high protein content.

As noted above, we discovered that the same treatment did not produce the same results with both brined and unbrined hides.

For example, waste from the unhairing effluent of brined hides containing 19.19% total solids, 1.45% $Ca^{++}$, 0.55% $Na_2S$, 0.891% TKN (Total Kjeldahl Nitrogen), 3.91% $Na^+$ and 0.89% fat was treated with 20 ppm anionic polyelectrolyte (X-400 by Swift & Co., diluted in water to 0.025%). Upon flocculation and settling, the settled sludge was centrifuged. 880 cc of clarified liquid per liter of waste processed was recovered from the centrifuged sludge. It contained 13.42% total solids and only 0.048% $Ca^{++}$ (as well as 0.766% TKN, 3.86% $Na^+$, 0.18% fat and 0.45% $Na_2S$). The wet centrifuged cake weighed 183 gm per liter of waste processed. This cake had 24.3% total solids (%.97% $Ca^{++}$, 1.16% TKN, and 3% $Na^+$ on the wet basis).

The supernatant from the settling step and centrate from the centrifugation step were combined, acidified to pH 4 and flashed at about 150° F under a vacuum of 27.5 in. Hg. Flashing reduced the $Na_2S$ content to 0.042% (over 90% removal). The $H_2S$ which flashed off was recovered in an alkaline solution. The flashed waste was then filtered to recover the proteins which precipitated at pH 4. The protein-rich filter cake had 32% solids and upon drying yielded 49.1 gm of dry product per liter of waste processed, containing 66% protein on dry solids basis. The clear filtrate contained 9.4% total solids (0.16% TKN and 0.045% $Ca^{++}$).

In treating the unhairing effluent from fresh hides, that is, hides which had not been brined, we found that, in order to optimize the results, we needed a new treatment process. Consequently, we discovered that sparging the waste from fresh hides with carbon dioxide followed by flocculation with a cationic polyelectrolyte prior to flashing off the hydrogen sulfide produced good results. The effect of carbon dioxide sparging followed by flocculation with a cationic polyelectrolyte on the calcium removal from a waste effluent obtained while unhairing fresh hides in a paddle vat can be seen in Table I, where it is shown that (a) flocculation with an anionic polyelectrolyte alone reduced that $Ca^{++}$ content of the waste from an original value of 0.26% to 0.210%, (b) a cationic polyelectrolyte decreased it to 0.161% (c) $CO_2$ sparging to pH 11 reduced it to 0.0296%, while (d) $CO_2$ sparging followed by addition of 20 ppm of a cationic polyelectrolyte reduced it even further to a value as low as 0.0034%.

Removal of calcium, which is present in the waste as lime, greatly decreases the amount of acid needed to acidify the waste for protein and $H_2S$ removal in the subsequent processing steps. The data in Table II shows that acid requirements of a fresh hide unhairing waste are reduced by settling, treatment with a cationic polyelectrolyte and sparging with $CO_2$. They are lowest, however, when $CO_2$ sparging is followed by flocculation with a cationic polyelectrolyte. The data further shows that; unlike fresh hide waste, brined hide waste was successfully flocculated with an anionic polyelectrolyte. It also shows that brined hide waste, like fresh hide waste, responds well to $CO_2$ sparging followed by flocculation with a polyelectrolyte. Since in practice, a tannery processes both types of hides and, therefore, has a mixture of both types of waste to dispose of, the best treatment method is one which works with both types of waste, i.e., $CO_2$ sparging followed by polyelectrolyte treatment. This is shown in Table II to be feasible since a mixed waste containing 50% of each type of waste and requiring 220 cc of 3N $H_2SO_4$ per liter of clarified supernatant to bring its pH to 4, needed only 96 cc of 3N $H_2SO_4$ per liter clarified supernatant after such treatment.

The removal of $H_2S$ from waste acidified to below pH 4 was found to be primarily a function of the vacuum in the vacuum chamber, the residence time, the pH, the temperature of the waste, and the protein content of the waste. In typical experiments on paddle vat wastes in which the vacuum ranged from 27 in Hg to 29 in Hg and the temperature ranged from 100° to 150° F, the residual $Na_2S$ in the flashed waste varied between 0.004% and 0.011%. Although theoretically most of the sulfur is in the form of $H_2S$ at pH 4, flashing of $H_2S$ was improved by lowering the pH even further. Thus, a waste which had 0.03% $Na_2S$ remaining after flashing at pH 4 and 150° F underwent more thorough $H_2S$ removal (to 0.009% $Na_2S$) when its pH before flashing was reduced to 2.

For the purposes of this invention, we preferred to flash off hydrogen sulfide at temperatures between 100° and 150° F. However, if running the process at these temperatures is not economically feasible and if there is no objection to a less thorough removal of hydrogen sulfide, flashing can be done at temperatures as low as 60° F. The additional residual hydrogen sulfide in the liquid after flashing at the lower temperatures is easily removed by other known means.

TABLE I

| | COMPOSITION OF SUPERNATANTS AFTER TREATMENT | | | | |
|---|---|---|---|---|---|
| Component Analyzed | Untreated Waste | X-400[a] Anionic | C-13[a] Cationic | $CO_2$ to pH 11 | $CO_2$ plus C-13 |
| | % | % | % | % | % |
| Total solids | 3.49 | 2.62 | 2.93 | 2.70 | |
| Total N | 0.259 | 0.238 | 0.242 | 0.253 | 0.224 |
| Ca++ | 0.267 | 0.210 | 0.161 | 0.0296 | 0.0034 |

[a]Flocculated with 20 ppm polyelectrolyte.
X-400 is an anionic polyelectrolyte from Swift and Co.
C-13, is Jaguar C-13, a cationic polyelectrlyte from Stein, Hall and Co., Inc.

TABLE II

| Type of Waste | Pretreatment[a] | ml 3N $H_2SO_4$ per L supernatant to acidity to pH4 |
|---|---|---|
| From fresh hides in paddle vat | original | 81 |
| | settled 2 hours | 61 |
| | cationic polyelectrolyte | 57 |
| | $CO_2$ | 44 |
| | $CO_2$ + cationic | 34 |
| Brined hides in hide processor | original | 360 |
| | settled 2 hours | 191 |
| | anionic polyelectrolyt4e | 147 |
| | $CO_2$ | 169 |
| | $CO_2$ + anionic polyelectrolyte | 142 |
| | $CO_2$ + cationic polyelectrolyte | 156 |
| Mixed effluent 50% fresh 50% brined hide waste | original | 220 |
| | $CO_2$ + cationic polyelectrolyte | 96 |

[a]The cationic polyelectrolyte used was Jaguar C-13 by Stein, Hall & Co., Inc.
The anionic polyelectrolyte was X-400 by Swift and Co.
Polyelectrolyte conc. 20 ppm.

We claim:

1. In a process for treating lime-sulfide unhairing waste from salt-cured hides wherein undissolved lime is flocculated out of the waste, the supernatant liquid acidified to a pH below 4.0 to liberate $H_2S$, and the liberated $H_2S$ absorbed in a caustic medium, the improvement which comprises flashing off the $H_2S$ from the supernatant acidified liquid at a temperature of about from 100° to 150° F and under a vacuum of about from 10 to 29.9 inches of mercury and recovering a protein-rich solid from the flashed waste.

2. In a process for treating lime-sulfide unhairing waste from unsalted hides and for treating mixtures of wastes from salted and unsalted hides wherein undissolved lime is flocculated out of the waste, the supernatant liquid acidified to a pH below 4.0 to liberate $H_2S$, and the liberated $H_2S$ absorbed in a caustic medium, the improvement which comprises sparging the waste with carbon dioxide prior to flocculation until the pH of the waste is lowered to about 11.0, flocculating with an effective amount of a strongly cationic polyelectrolyte, and then flashing off the $H_2S$ from the supernatant acidified liquid at a temperature of about 100° to 150° F. and under a vacuum of about from 10 to 29.9 inches of mercury and recovering a protein-rich solid from the flashed waste.

* * * * *